United States Patent
Zhang et al.

(10) Patent No.: US 11,285,442 B2
(45) Date of Patent: Mar. 29, 2022

(54) SELF-SUPPORTING HIGHLY MOISTURE-PERMEABLE HEAT-INSULATING AEROGEL FILM AND PREPARATION METHOD THEREOF

(71) Applicant: SOUTH CHINA UNIVERSITY OF TECHNOLOGY, Guangdong (CN)

(72) Inventors: Lizhi Zhang, Guangdong (CN); Qianwen Su, Guangdong (CN)

(73) Assignee: SOUTH CHINA UNIVERSITY OF TECHNOLOGY, Guangdong (CN)

(*) Notice: Subject to any disclaimer, the term of this patent is extended or adjusted under 35 U.S.C. 154(b) by 296 days.

(21) Appl. No.: 16/638,468

(22) PCT Filed: Apr. 23, 2018

(86) PCT No.: PCT/CN2018/084001
§ 371 (c)(1),
(2) Date: Feb. 12, 2020

(87) PCT Pub. No.: WO2019/024544
PCT Pub. Date: Feb. 7, 2019

(65) Prior Publication Data
US 2020/0261854 A1    Aug. 20, 2020

(30) Foreign Application Priority Data
Jul. 31, 2017    (CN) .......................... 201710643131.5

(51) Int. Cl.
*B01D 67/00*    (2006.01)
*B01D 53/26*    (2006.01)
(Continued)

(52) U.S. Cl.
CPC ....... *B01D 67/0002* (2013.01); *B01D 53/268* (2013.01); *B01D 61/025* (2013.01);
(Continued)

(58) Field of Classification Search
CPC ................ B01J 13/0091; B01J 13/0069; B01J 20/3078; C08J 9/0085; B01D 2323/30;
(Continued)

(56) References Cited

U.S. PATENT DOCUMENTS 5,948,148 A * 9/1999 Cuevas B. .......... D06M 15/693
106/18.13
8,845,937 B2 * 9/2014 Gawryla .............. B01J 13/0091
264/28

(Continued)

FOREIGN PATENT DOCUMENTS

CN        1544324      11/2004
CN      104479174       4/2015
(Continued)

OTHER PUBLICATIONS

CN1544324A machine translation. (Year: 1120).*
(Continued)

*Primary Examiner* — Ana M Fortuna
(74) *Attorney, Agent, or Firm* — JCIPRNET

(57) ABSTRACT

The invention relates to a self-supporting highly moisture-permeable heat-insulating aerogel film and a preparation method thereof. The aerogel film is a self-supporting single-layer film with a SiO$_2$ porous skeleton structure, having a thickness of 150 μm to 300 μm, which increases an exchange rate of vapor by 50% to 200%, and reduces a heat conductivity coefficient by 50% to 90%. The preparation method includes the following steps: (1) preparation of a template; (2) hydrolysis of nano-cellulose; (3) preparation of an aerogel film; and (4) post-treatment of the aerogel film.

18 Claims, 4 Drawing Sheets

(51) Int. Cl.
*B01D 61/02* (2006.01)
*B01D 69/02* (2006.01)
*B01D 69/08* (2006.01)
*B01D 71/10* (2006.01)
*B01D 71/82* (2006.01)
*B01J 13/00* (2006.01)
*C02F 1/44* (2006.01)
*C02F 103/08* (2006.01)

(52) U.S. Cl.
CPC ............ *B01D 69/02* (2013.01); *B01D 69/08* (2013.01); *B01D 71/10* (2013.01); *B01D 71/82* (2013.01); *B01J 13/0091* (2013.01); *C02F 1/441* (2013.01); *B01D 2325/04* (2013.01); *B01D 2325/24* (2013.01); *B01D 2325/26* (2013.01); *C02F 2103/08* (2013.01)

(58) Field of Classification Search
CPC .... B01D 67/002; B01D 69/025; B01D 69/00; B01D 71/82
See application file for complete search history.

(56) References Cited

U.S. PATENT DOCUMENTS

2014/0155301 A1  6/2014  Nelson et al.
2021/0206926 A1* 7/2021  Bertino .................. C08J 9/0085

FOREIGN PATENT DOCUMENTS

CN     106987831     7/2017
CN     107335345     11/2017

OTHER PUBLICATIONS

"International Search Report (Form PCT/ISA/210) of PCT/CN2018/084001," dated Jul. 6, 2018, with English translation thereof, pp. 1-4.

* cited by examiner

SELF-SUPPORTING HIGHLY MOISTURE-PERMEABLE HEAT-INSULATING AEROGEL FILM AND PREPARATION METHOD THEREOF

CROSS-REFERENCE TO RELATED APPLICATION

This application is a 371 of international application of PCT application serial no. PCT/CN2018/084001, filed on Apr. 23, 2018, which claims the priority benefit of Chinese application no. 201710643131.5, filed on Jul. 31, 2017. The entirety of each of the above-mentioned patent applications is hereby incorporated by reference herein and made a part of this specification.

BACKGROUND

Technical Field

The invention relates to the technical field of preparation of films used for water treatment and air dehumidification, and in particular relates to a self-supporting highly moisture-permeable heat-insulating aerogel film and a preparation method thereof.

Description of Related Art

Freshwater resources are one of the most important material bases for human survival and development. Seawater desalination and wastewater purification technologies are gradually becoming important means to solve the shortage of freshwater resources.

Seawater desalination, also known as seawater desalting, is a process of separating salt from water in the seawater. There are two commonly used seawater desalination methods including a hot process and a film process. Multi-stage flash evaporation, multi-effect distillation and vapor compression distillation are mainly adopted in the hot process. The film process mainly refers to reverse osmosis. The hot process usually needs to consume a large amount of high-grade energy, and also needs complicated and expensive production equipment. The reverse osmosis technique of the film process is a technique that makes use of a selective permeability of a semipermeable film to make water pass through the semipermeable film in a reverse concentration gradient under an additionally applied high pressure, so that salt and impurities are trapped on the other side of the film. The reverse osmosis process is generally driven by electric energy and mechanical energy. A system needs to maintain a high operating pressure, which requires high pressure resistance on equipment. Common problems faced by the present hot process and film process seawater desalination technologies are that the requirements on the equipment are high, the consumption of the high-grade energy is huge, and the fresh water yield of the seawater is low.

Meanwhile, people also pay more and more attention to improvement of an indoor environment. Dehumidification methods may be divided into cooling dehumidification, desiccant dehumidification (including liquid absorption dehumidification and solid absorption dehumidification), film permeation dehumidification and electrochemical dehumidification according to dehumidification mechanisms. The cooling dehumidification method uses a cooling coil to reduce a temperature of air below a dew point temperature of the air, so that moisture in the air condenses on a surface of a cooler. The film permeation dehumidification method is a method that uses a selective permeability of the film to the moisture in the air to transfer the moisture from a side with a high partial pressure of vapor to a side with a low partial pressure of vapor, thus realizing dehumidification of the air on the side with the high partial pressure of vapor. The electrochemical dehumidification is to decompose the vapor into oxygen and protons at an anode of a battery, and then transfer the protons to a cathode to generate hydrogen molecules or combine with oxygen to generate water, so as to reduce the moisture in the air.

All the cooling dehumidification, the film permeation dehumidification and the electrochemical dehumidification methods mentioned above have big disadvantages. The cooling dehumidification method needs to cool the temperature of the air below the dew point of the air, and the cooled air needs to be heated again before being sent into a room. During this process, the temperature and the humidity cannot be independently controlled, resulting in a low energy utilization rate and a high energy consumption. The moisture condenses on the surface of the cooler, making the cooler moist all the year round, which provides a place for bacteria to grow and multiply, and seriously degrades quality of the indoor air. However, when the dew point temperature is too low, the surface of the cooler is easy to frost, which requires a special device to defrost the cooler. The film dehumidification is a passive dehumidification method, and a dehumidification capability thereof is controlled by one side with a lower vapor pressure in moisture exchange gas. A film material is an important factor affecting the film dehumidification, and a quality of the film material determines a performance of a whole dehumidification process. The electrochemical dehumidification is a very novel dehumidification method, a technology of which is not mature enough. In addition, a DC power supply is needed in the dehumidification process, so that the energy utilization rate is low.

The disadvantages of the current films are that it is difficult to simultaneously meet the contradiction between high moisture permeability and blocking permeation of other gas molecules, energy losses caused by the higher heat conductivity coefficient of the film material itself is too large, a preparation cost is too high, and the materials used are not environmentally friendly.

SUMMARY

The invention aims to provide a self-supporting highly moisture-permeable heat-insulating aerogel film direct at the defects of the prior art. The self-supporting highly moisture-permeable heat-insulating aerogel film can be used to realize independent air dehumidification or seawater desalination; when being used for independent air dehumidification, the self-supporting highly moisture-permeable heat-insulating aerogel film can realize high moisture permeability of air, high mechanical strength and extremely low heat conductivity coefficient, and has a strong blocking effect on other gas molecules including $N_2$, and can reduce sensible heat transfer in the process; and when being used for seawater desalination, the self-supporting highly moisture-permeable heat-insulating aerogel film has a high selective permeability, can reduce requirements and energy consumption of equipment, and improve a seawater desalination yield.

The invention also aims to provide a preparation method of the self-supporting highly moisture-permeable heat-insulating aerogel film. The method employs low-toxicity solvents and non-toxic additives, which has the advantages of environment-friendly production process, simple technology, and low production cost.

The objects of the invention are achieved by the following technical solutions.

A preparation method of a self-supporting highly moisture-permeable heat-insulating aerogel film includes the following steps:

(1) preparation of a template: washing a glass substrate to remove oil stains on a surface; filtering a solution of a high-molecular polymer through microporous filter paper and then coating the filtered solution on the glass substrate to obtain a template for later use;

(2) hydrolysis of nano-cellulose: uniformly dispersing nano-cellulose whiskers in an organic solvent under heating and stirring, and then adding a silicon source, an acid and deionized water for hydrolysis;

(3) preparation of an aerogel film: after the hydrolysis, standing the mixture, adding a gel solution for gelling, coating the obtained gel on one side of the template having the high-molecular polymer to form an aerogel film and rapidly soaking the aerogel film in a solvent, and then taking out the aerogel film to obtain a template loaded with the aerogel film; and (4) post-treatment of the aerogel film: subjecting the template loaded with the aerogel film to solvent exchange and surface modification, drying, obtaining an aerogel film by stripping the aerogel film from the glass substrate, and then calcining the aerogel film at high temperature to obtain the self-supporting highly moisture-permeable heat-insulating aerogel film.

Further, in the step (1), the washing is to soak the glass substrate in ethanol, acetone and deionized water in sequence for respective ultrasound treatment for 20 minutes to 40 minutes.

Further, in the step (1), the high-molecular polymer includes a terpolymer of acrylamide/2-acrylamido-2-methylpropane sulfonic acid (PAMS).

Further, in the step (1), the solution of the high-molecular polymer has a mass concentration of 10 wt. % to 20 wt. %.

Further, in the step (1), the microporous filter paper has a pore size of 30 μm to 50 μm, and fiber residues with large particle size of the high-molecular polymer are removed by filtering through the microporous filter paper.

Further, in the step (2), the nano-cellulose whiskers are prepared through the following method:

dissolving cellulose powder in concentrated sulfuric acid under heating and stirring, cooling the mixture to room temperature, centrifugally washing the mixture with distilled water to obtain an emulsion suspension without layering; and after dialyzing and separating the obtained emulsion suspension, washing obtained crystals with water and then lyophilizing the crystals to obtain the nano-cellulose whiskers.

Still further, the heating and stirring is to stir at 60° C. to 80° C.

Still further, the concentrated sulfuric acid has a concentration of 50 wt. % to 70 wt. %;

Still further, the cooling to room temperature is to directly add distilled water for cooling.

Still further, the dialyzing is to put the emulsion suspension obtained by centrifugation into a cellulose dialysis bag and then put the dialysis bag into deionized water for dialysis until a pH value of a dialysate reaches 7.0.

Still further, the lyophilizing is to lyophilize at −50° C. to −30° C.

Further, in the step (2), the silicon source includes one of tetramethyl orthosilicate (TMOS), tetraethyl orthosilicate (TEOS), methyltrimethoxysilane, water glass, trimethylethoxysilane and silsesquioxane.

Further, in the step (2), different organic solvents are added according to different silicon sources: when the silicon source is tetramethyl orthosilicate, the organic solvent is dimethyl sulfoxide (DMSO); when the silicon source is tetraethyl orthosilicate, the organic solvent is ethanol; when the silicon source is methyltrimethoxysilane, the organic solvent is tetrahydrofuran; when the silicon source is sodium silicate, the organic solvent is toluene; and when the silicon source is trimethylethoxysilane or silsesquioxane, the organic solvent is dimethylacetamide.

Further, in the step (2), a solid-liquid ratio of the nano-cellulose whiskers to the organic solvent is 5-10:80-100 g/ml.

Further, in the step (2), a mass ratio of the organic solvent to the silicon source is 0.8-1.5:0.3-0.6.

Further, in the step (2), a volume ratio of the organic solvent to the deionized water is 30-50:2-4.

Further, in the step (2), an addition amount of the acid is added according to a molar ratio of hydrogen atoms in the acid to silicon atoms in the silicon source of $10^{-5}$-$10^{-3}$:1-3, wherein a pH value of the solution after the acid is added is 5-6.

Further, in the step (2), the heating and stirring is to heat and stir at 40° C. to 80° C.

Further, in the step (2), the hydrolysis is carried out for 6 hours to 12 hours at a temperature of 40° C. to 80° C.

Further, in the step (3), the standing lasts for 24 hours to 48 hours.

Further, in the step (3), the gel solution includes one or more than one of aqueous ammonia, ethanol, dimethyl sulfoxide and hexamethyldisilazane.

Further, in the step (3), the gelling is to add the gel solution to enable a viscosity of the gel to reach 7 cP to 20 cP.

Further, in the step (3), the solvent includes one or more than one of ethanol, tetraethyl orthosilicate and dimethyl sulfoxide.

Further, in the step (3), the soaking lasts for 24 hours to 72 hours, and the solvent is changed every 8 hours to 16 hours.

Further, in the step (4), the solvent exchange and surface modification are to replace the solvent in the silica sol used for soaking in the step (3) with one of dimethyl sulfoxide, n-hexane, n-heptane and n-butane at a constant temperature of 40° C. to 60° C. and then to soak the template with a trimethylchlorosilane (TMCS) solution for 24 hours to 28 hours to perform surface modification;

Still further, one of the n-hexane, the n-heptane and the n-butane is employed as a solvent of the trimethylchlorosilane solution, wherein a volume ratio of the trimethylchlorosilane to the solvent is 1:9-15.

Further, in the step (4), the drying is to dry at 80° C. to 120° C. under normal pressure for 24 hours to 48 hours.

Further, in the step (4), the calcining at high temperature is carried out for 4 hours to 8 hours at 350° C. to 450° C.

Further, in the steps (1) and (3), the coating is to manually wipe the film by a scraper or to coat the film by a mechanical coating machine.

A self-supporting highly moisture-permeable heat-insulating aerogel film prepared by any one of the methods described above is a self-supporting single-layer film with a $SiO_2$ porous skeleton structure, which has a thickness of 150 μm to 300 μm. The $SiO_2$ porous skeleton structure is a three-dimensional network structure; and a calcined polymer film is completely removed, and the polymer film formed in the step (1) is not included in the finally obtained self-supporting highly moisture-permeable heat-insulating aerogel film.

Further, the self-supporting highly moisture-permeable heat-insulating aerogel film includes two film types of a flat film and a hollow fiber film; and the hollow fiber film is formed by rolling the flat film.

The flat film has a large relative flux per unit film area and good pollution resistance. However, the hollow fiber film has a high filling density per unit volume film area and low manufacturing cost.

Further, the self-supporting highly moisture-permeable heat-insulating aerogel film has a heat conductivity coefficient of 0.02 W/(mK) to 0.03 W/(mK).

The self-supporting highly moisture-permeable heat-insulating aerogel film can be used to realize independent air dehumidification or seawater desalination.

Compared with the prior art, the invention has the following advantages and beneficial effects.

(1) The self-supporting highly moisture-permeable heat-insulating aerogel film of the invention has high moisture permeability and high selective permeability, and under the same experimental conditions, can improve an exchange rate of vapor by 50% to 200% in comparison with a traditional solid composite film.

(2) The self-supporting highly moisture-permeable heat-insulating aerogel film of the invention has a high strength and contains the nano-cellulose whiskers, thus greatly enhancing mechanical properties of the aerogel film.

(3) The self-supporting highly moisture-permeable heat-insulating aerogel film of the invention has a good heat-insulating property, and the silica aerogel is a low heat conductive material, which is made into a film form at a proper viscosity, so that the heat conductivity coefficient of the film can be greatly reduced; the measured heat conductivity coefficient of the film is 0.02 W/(mK) to 0.03 W/(mK), which is 50% to 90% lower than that of the traditional solid composite film, and is reduced by 82.3% to 88.2% than that of a commonly used polyvinylidene fluoride (PVDF) film (0.17 W/(mK));

therefore, the invention has a great practical application significance.

(4) The self-supporting highly moisture-permeable heat-insulating aerogel film of the invention has the advantage of an extremely high porosity, which reaches 80% to 95%.

(5) The preparation method of the invention is simple and easy to operate, employs low-toxicity solvents and non-toxic additives, has environment-friendly production process and low equipment requirements, is good in film forming property, and is low in production cost.

DESCRIPTION OF THE EMBODIMENTS

In order to better understand the invention, the invention will be further illustrated in detail below with reference to the specific embodiments and drawings, but the embodiments of the invention are not limited thereto, and the process parameters not specifically described may be referred to the conventional techniques.

Figure 1:
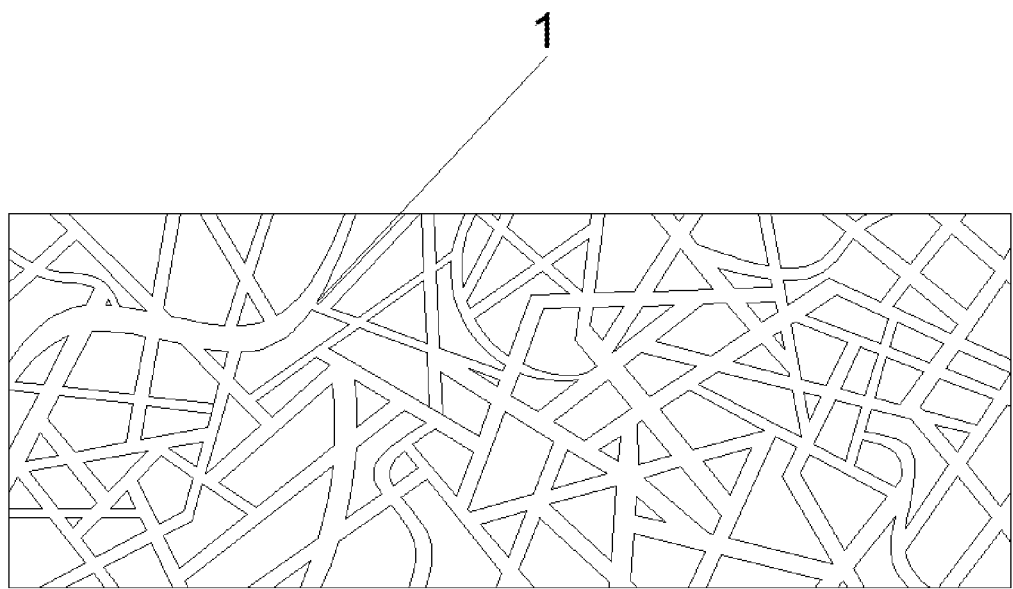
FIG. 1 is a schematic structure diagram illustrating a flat film type of a self-supporting highly moisture-permeable heat-insulating aerogel film according to the invention.
Figure 2:
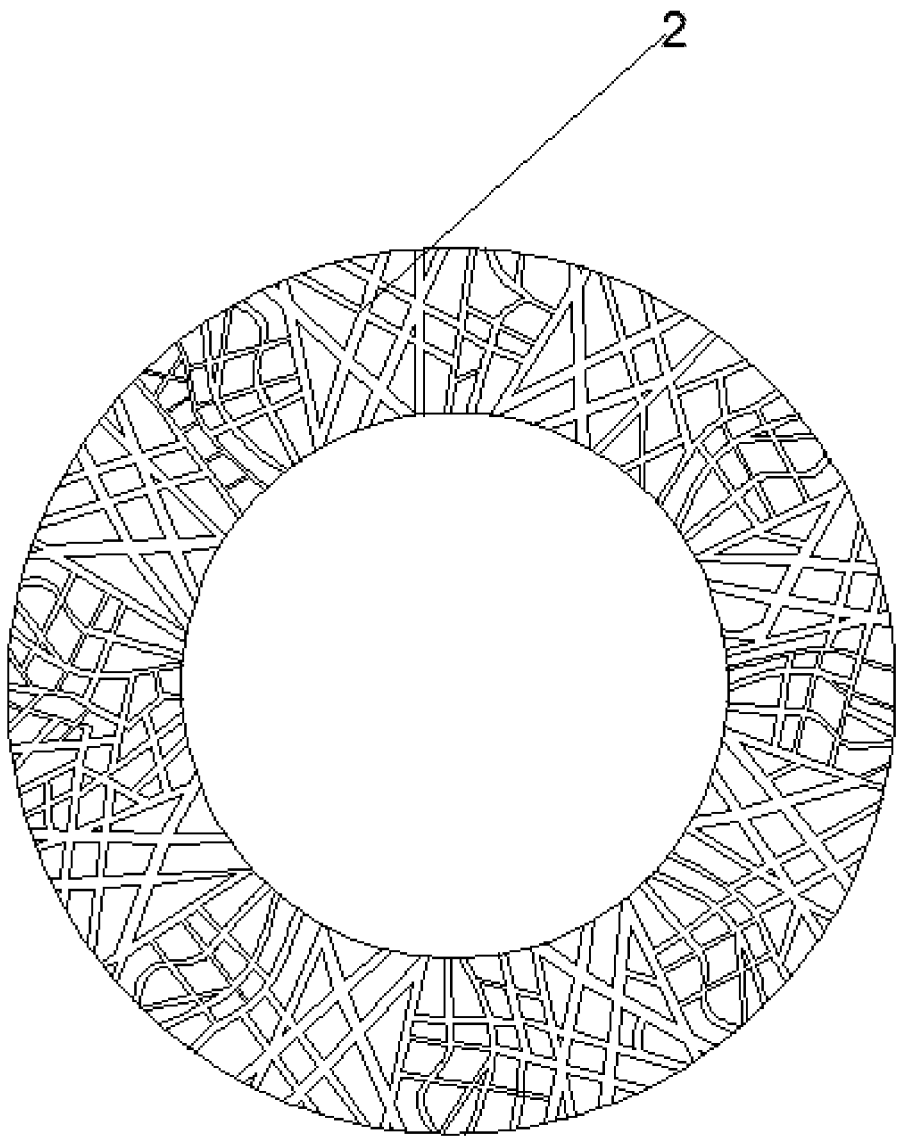
FIG. 2 is a schematic structure diagram illustrating a hollow fiber film type of the self-supporting highly moisture-permeable heat-insulating aerogel film according to the invention.

Schematic structure diagrams of a single-layer flat film type and a hollow fiber film type of a self-supporting highly moisture-permeable heat-insulating aerogel film of the invention are shown in FIG. 1 and FIG. 2 respectively, which are both single-layer films having a $SiO_2$ porous supporting skeleton and a thickness of 150 μm to 300 μm. The single-layer porous supporting skeletons of a flat film 1 of FIG. 1 and a hollow fiber film 2 of FIG. 2 are both a three-dimensional network structure. The flat film 1 has a large relative flux per unit film area and good pollution resistance. However, the hollow fiber film 2 is formed by rolling the flat film 1, and has a high filling density per unit volume film area and low manufacturing cost.

The flat film is used for independent air dehumidification and seawater desalination.

Figure 3:
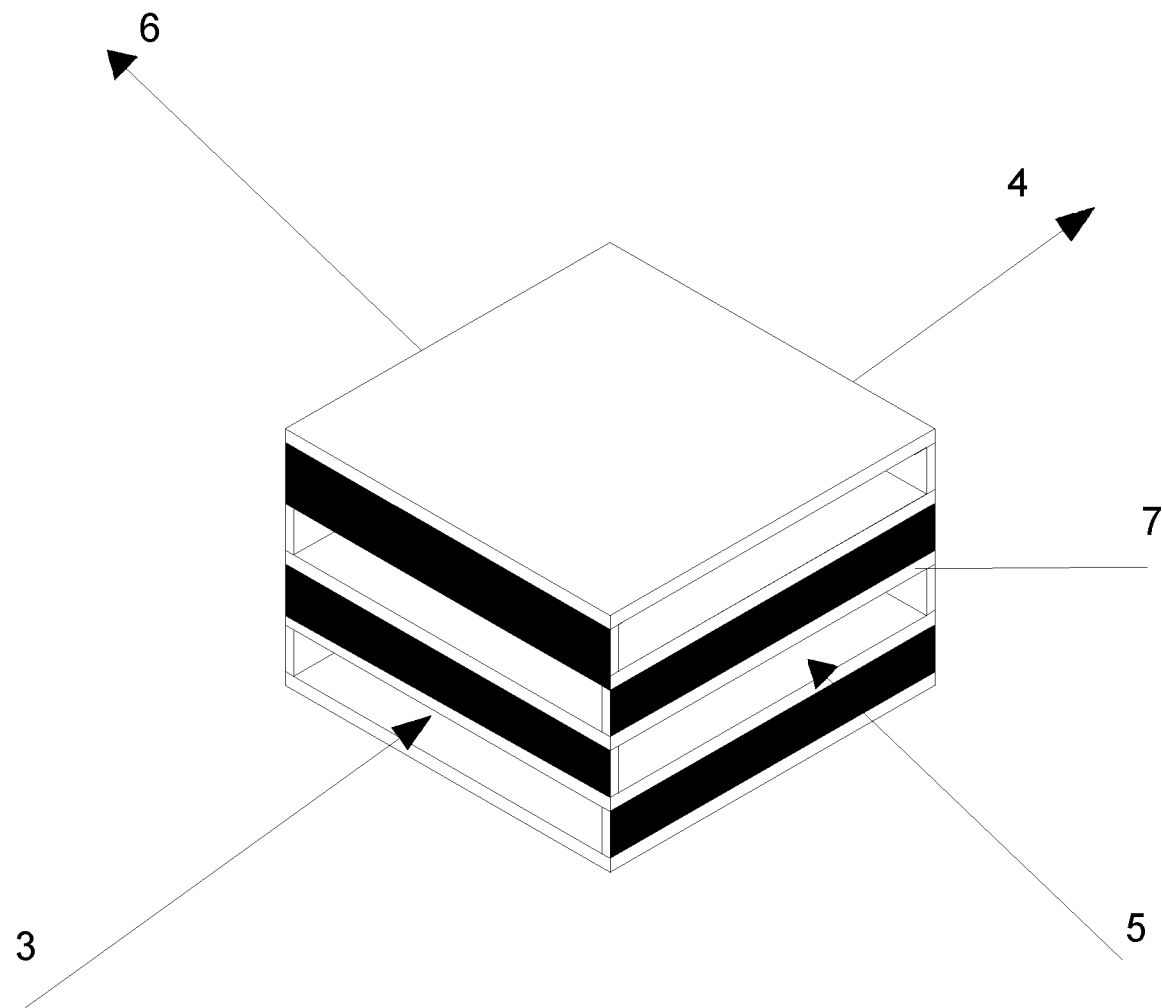
FIG. 3 is a schematic structure diagram illustrating the flat film of the self-supporting highly moisture-permeable heat-insulating aerogel film shown in FIG. 1 used for a dehumidifier and a seawater desalinizer.

FIG. 3 is a schematic structure diagram illustrating the flat film of the self-supporting highly moisture-permeable heat-insulating aerogel film used for an independent air dehumidifier and a seawater desalinizer. Both the independent air dehumidifier and the seawater desalinizer employ a core body of the flat film, and the flat film is made into a self-supporting highly moisture-permeable heat-insulating aerogel base film with the same size as a bottom surface of the core body. The core body includes a solution channel inlet 3, a solution channel outlet 4, an air channel inlet 5, an air channel outlet 6 and a self-supporting highly moisture-permeable heat-insulating aerogel base film 7. The core body is a tetragonal core body in which a solution channel and an air channel are alternately laminated, the solution channel inlet 3 and the air channel inlet 5 are respectively arranged on two adjacent side surfaces, while the solution channel outlet 4 and the air channel outlet 6 are respectively arranged on the other two adjacent side surfaces of the tetragonal core body. The solution channel inlet 3 and the solution channel outlet 4 are communicated and positioned on opposite side surfaces, while the air channel inlet 5 and the air channel outlet 6 are communicated and positioned on opposite side surfaces, so that a solution and air form a cross flow in the working process. The lamination of the solution channel and the air channel is separated by the base film 7, thus ensuring that upper and lower bottoms of the solution channel and the air channel are both the self-supporting highly moisture-permeable heat-insulating aerogel base film 7.

During the working process that the core body is used for independent air dehumidification, a dehumidifying solution enters the solution channel from the solution channel inlet 3, high-temperature and high-humidity outdoor air enters the air channel from the air channel inlet 5, the dehumidifying solution and the outdoor air form a cross flow to exchange heat and moisture in the core body. The low-humidity air after the heat and moisture exchange is discharged from the air channel outlet 6, and the dehumidifying solution after the heat and moisture exchange is discharged from the solution channel outlet 4, thus achieving the purpose of independently adjusting an indoor air humidity.

During the working process that the core body is used for seawater desalination, heated seawater enters the solution channel from the solution channel inlet 3, air enters the air channel from the air channel inlet 5, and the heated seawater and the air form a cross flow. In the core body, the heated seawater humidifies the air to obtain high-humidity air. Seawater is discharged from the solution channel outlet 4, while humidified air is discharged from the air channel outlet 6 and purified water is separated out through a water-cooled heat exchanger, thus achieving the purpose of seawater desalination.

The hollow fiber film is used for independent air dehumidification and seawater desalination.

Figure 4:
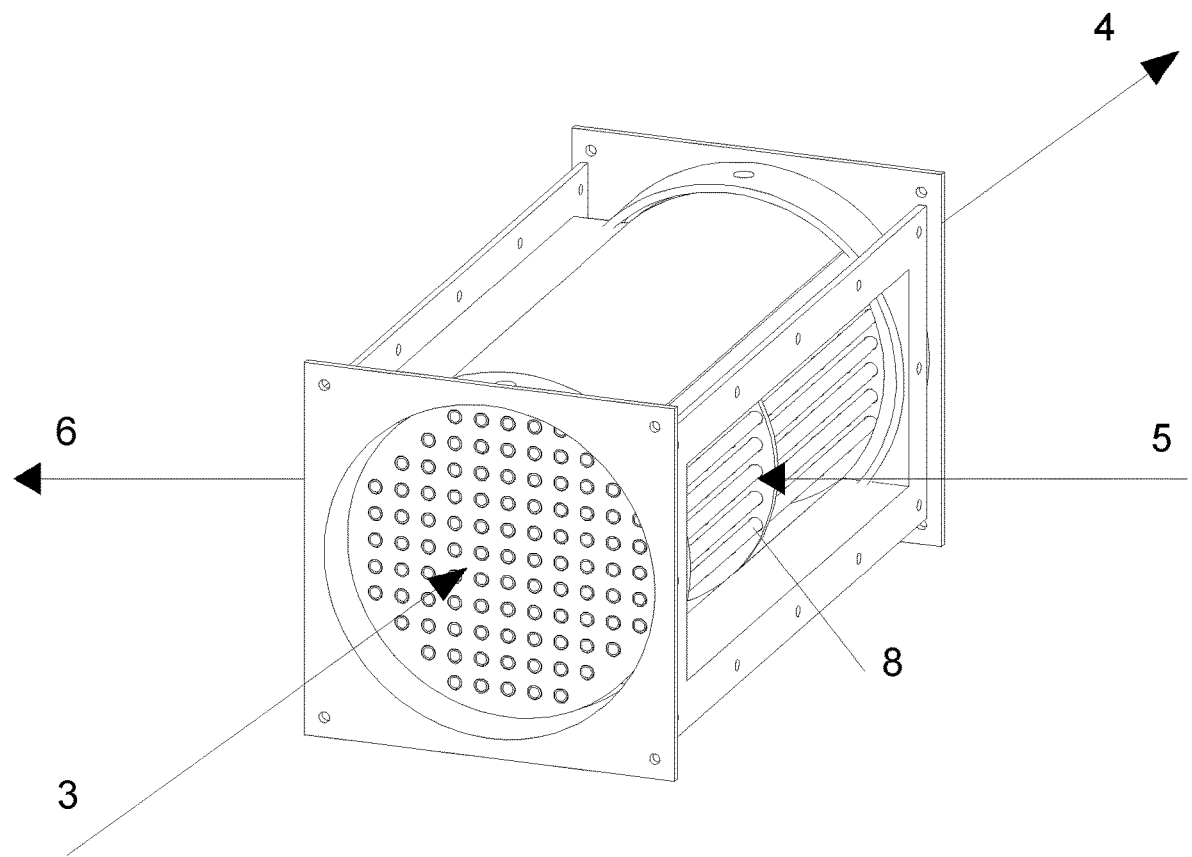
FIG. 4 is a schematic structure diagram illustrating the hollow fiber film of the self-supporting highly moisture-permeable heat-insulating aerogel film shown in FIG. 2 used for a dehumidifier and a seawater desalinizer.

FIG. 4 is a schematic structure diagram illustrating the hollow fiber film of the self-supporting highly moisture-permeable heat-insulating aerogel film used for an independent air dehumidifier and a seawater desalinizer. Both the independent air dehumidifier and the seawater desalinizer are shells with closed upper and lower bottom surfaces and unclosed peripheral side surfaces. Flat films are rolled into hollow fiber film tubes 8, and a plurality of the hollow fiber film tubes 8 are assembled into a tube bundle with gaps, wherein both ends of the tube bundle are respectively fixed on the shell and none ports of the hollow fiber film tubes 8 are closed, so that the hollow fiber film tubes 8 serve as solution channels. One port of the hollow fiber film tube 8 is a solution channel inlet 3 and the other port thereof is a solution outlet 4. The unclosed side surface adjacent to the solution channel inlet 3 is an air channel inlet 5, and the other unclosed side surface opposite to the air channel inlet 5 is an air channel outlet 6. Air enters the shell and forms a cross flow with a solution.

During the working process that the shell is used for independent air dehumidification, a dehumidifying solution enters the solution channel formed by the hollow fiber film tube 8 from the solution channel inlet 3, high-temperature and high-humidity outdoor air enters the shell from the air channel inlet 5 which is namely the side face adjacent to the solution channel inlet 3. The outdoor air and the dehumidifying solution form a cross flow to exchange heat and moisture. The low-humidity air after the heat and moisture exchange is discharged from the air channel outlet 6, and the dehumidifying solution after the heat and moisture exchange is discharged from the solution channel outlet 4, thus achieving the purpose of independently adjusting an indoor air humidity.

During the working process that the shell is used for seawater desalination, heated seawater enters the hollow fiber film tube 8 from the solution channel inlet 3, air enters the shell from the air channel inlet 5, and the heated seawater and the air form a cross flow. In the shell, the heated seawater humidifies the air to obtain high-humidity air. Seawater is discharged from the solution channel outlet 4, while humidified air is discharged from the air channel outlet 6 and purified water is separated out through a water-cooled heat exchanger, thus achieving the purpose of seawater desalination.

The nano-cellulose whiskers in the specific embodiments of the invention are prepared by the following method, which specifically includes the following steps:

dissolving cellulose powder in concentrated sulfuric acid with a concentration of 50 wt. % to 70 wt. % under heating and stirring at 60° C. to 80° C., adding distilled water, cooling the mixture to room temperature, and centrifugally washing the mixture with distilled water to obtain an emulsion suspension without layering; and putting the obtained emulsion suspension into a cellulose dialysis bag and then putting the dialysis bag into deionized water for dialysis until a pH value of a dialysate reaches 7.0, washing obtained crystals with distilled water and then lyophilizing the crystals at −50° C. to −30° C. to obtain the nano-cellulose whiskers.

Embodiment 1

(1) Preparation of a template: a glass substrate was soaked in ethanol, acetone and deionized water in sequence, and ultrasonically washed for 20 minutes respectively to remove oil stains on a surface, a solution of a terpolymer of acrylamide/2-acrylamido-2-methylpropane sulfonic acid (PAMS) with a concentration of 10 wt. % was filtered through microporous filter paper with a pore size of 30 μm to 50 μm, and then coated on the glass substrate with a coating thickness of 150 μm to obtain a template for later use.

(2) Hydrolysis of nano-cellulose: 5 g of nano-cellulose whiskers were evenly dispersed in 100 mL of dimethyl sulfoxide under heating and stirring at 50° C., then 22.4 mL of tetramethyl orthosilicate, 0.1 mL of hydrochloric acid with a concentration of 0.1 mol/L and 2 mL of deionized water were added for hydrolysis at 50° C. for 6 hours, wherein a pH of the solution after adding the acid was 5.

(3) Preparation of an aerogel film: after the hydrolysis, the mixture was stood for 24 hours, then 1 ml of aqueous ammonia with a concentration of 0.357 mol/L and 32.15 mL of dimethyl sulfoxide were added for gelling to make a gel viscosity reach 7 cP, the obtained gel was coated on one side of the template having the PAMS to form an aerogel film with a thickness of 150 μm and the aerogel film was rapidly soaked in ethanol for 24 hours, wherein the ethanol was replaced three times during the period, and then the aerogel film was taken out to obtain a template loaded with the aerogel film.

(4) Post-treatment of the aerogel film: The template loaded with the aerogel film was subjected in a dimethyl sulfoxide solvent at a constant temperature of 60° C. to replace the ethanol in silica sol, and subjected to surface modification by soaking the template loaded with the aerogel film in a mixed solution of TMCS and n-hexane in a volume ratio of 1:9 for 24 hours, dried at 100° C. under normal pressure for 48 hours, and an aerogel film was obtained by being stripped from the glass substrate, then the aerogel film was calcined at a high temperature of 350° C. for 4 hours to obtain the self-supporting highly moisture-permeable heat-insulating aerogel film.

The obtained self-supporting highly moisture-permeable heat-insulating aerogel film has a thickness of 150 μm, is a flat film, and has a heat conductivity coefficient of 0.025 W/(mK), a porosity of 90%, a tensile strength of 1.7 MPa, and an exchange efficiency of vapor of 80%, which is improved by 100% than that of a traditional solid composite film (40%).

Embodiment 2

(1) Preparation of a template: a glass substrate was soaked in ethanol, acetone and deionized water in sequence, and ultrasonically washed for 40 minutes respectively to remove oil stains on a surface, a solution of a terpolymer of acrylamide/2-acrylamido-2-methylpropane sulfonic acid (PAMS) with a concentration of 20 wt. % was filtered through microporous filter paper with a pore size of 30 μm to 50 µm, and then coated on the glass substrate with a coating thickness of 200 µm to obtain a template for later use.

(2) Hydrolysis of nano-cellulose: 3 g of nano-cellulose whiskers were evenly dispersed in 50 mL of ethanol under heating and stirring at 50° C., then 27.2 mL of tetraethyl orthosilicate, 1 mL of oxalic acid with a concentration of 0.1 mol/L and 4 mL of deionized water were added for hydrolysis at 50° C. for 12 hours, wherein a pH of the solution after adding the acid was 5.5.

(3) Preparation of an aerogel film: after the hydrolysis, the mixture was stood for 24 hours, then 0.5 ml of strong aqueous ammonia with a concentration of 10 mol/L and 10 mL of ethanol were added for gelling to make a gel viscosity reach 10 cP, the obtained gel was coated on one side of the template having the PAMS to form an aerogel film with a thickness of 200 µm and the aerogel film was rapidly soaked in dimethyl sulfoxide for 24 hours, wherein the dimethyl sulfoxide was replaced three times during the period, and then the aerogel film was taken out to obtain a template loaded with the aerogel film.

(4) Post-treatment of the aerogel film: the template loaded with the aerogel film was subjected in n-hexane at a constant temperature of 40° C. to replace the ethanol in silica sol, and subjected to surface modification by soaking the template loaded with the aerogel film in a mixed solution of TMCS and n-hexane in a volume ratio of 1:10 for 32 hours, dried at 80° C. under normal pressure for 48 hours, and an aerogel film was obtained by being stripped from the glass substrate, and then the aerogel film was calcined at a high temperature of 450° C. for 8 hours to obtain the self-supporting highly moisture-permeable heat-insulating aerogel film.

The obtained self-supporting highly moisture-permeable heat-insulating aerogel film has a thickness of 200 µm, is a flat film which is rolled to form a hollow fiber film. The hollow fiber film has a heat conductivity coefficient of 0.02 W/(mK), a porosity of 95%, a strength of 1.3 MPa, and an exchange efficiency of vapor of 120%, which is improved by 200% than that of a traditional solid composite film (40%).

Embodiment 3

(1) Preparation of a template: a glass substrate was soaked in ethanol, acetone and deionized water in sequence, and ultrasonically washed for 30 minutes respectively to remove oil stains on a surface, a solution of a terpolymer of acrylamide/2-acrylamido-2-methylpropane sulfonic acid (PAMS) with a concentration of 15 wt. % was filtered through microporous filter paper with a pore size of 30 µm to 50 µm, and then coated on the glass substrate with a coating thickness of 300 µm to obtain a template for later use.

(2) Hydrolysis of nano-cellulose: 10 g of nano-cellulose whiskers were evenly dispersed in 90 mL of tetrahydrofuran under heating and stirring at 80° C., then 18.2 mL of methyltrimethoxysilane, 0.5 mL of phosphoric acid with a concentration of 0.1 mol/L and 3 mL of deionized water were added for hydrolysis at 50° C. for 8 hours, wherein a pH of the solution after adding the acid was 6.

(3) Preparation of an aerogel film: after the hydrolysis, the mixture was stood for 48 hours, then 5 ml of hexamethyldisilazane was added for gelling to make a gel viscosity reach 8 cP, the obtained gel was coated on one side of the template having the PAMS by a mechanical coating machine to form an aerogel film with a thickness of 200 µm and the aerogel film was rapidly soaked in ethanol for 24 hours, wherein the ethanol was replaced three times during the period, and then the aerogel film was taken out to obtain a template loaded with the aerogel film.

(4) Post-treatment of the aerogel film: the template loaded with the aerogel film was subjected in n-heptane at a constant temperature of 50° C. to replace the ethanol in silica sol, and subjected to surface modification by soaking the template loaded with the aerogel film in a mixed solution of TMCS and n-heptane in a volume ratio of 1:15 for 48 hours, dried at 120° C. under normal pressure for 48 hours, and an aerogel film was obtained by being stripped from the glass substrate, and then the aerogel film was calcined at a high temperature of 350° C. for 4 hours to obtain the self-supporting highly moisture-permeable heat-insulating aerogel film.

The obtained self-supporting highly moisture-permeable heat-insulating aerogel film has a thickness of 300 µm, is a flat film, and has a heat conductivity coefficient of 0.03 W/(mK), a porosity of 80%, a strength of 2.0 MPa, and an exchange efficiency of vapor of 60%, which is improved by 50% than that of a traditional solid composite film (40%).

Embodiment 4

(1) Preparation of a template: a glass substrate was soaked in ethanol, acetone and deionized water in sequence, and ultrasonically washed for 20 minutes respectively to remove oil stains on a surface, a solution of a terpolymer of acrylamide/2-acrylamido-2-methylpropane sulfonic acid (PAMS) with a concentration of 15 wt. % was filtered through microporous filter paper with a pore size of 30 µm to 50 µm, and then coated on the glass substrate with a coating thickness of 200 µm to obtain a template for later use.

(2) Hydrolysis of nano-cellulose: 10 g of nano-cellulose whiskers were evenly dispersed in 100 mL of toluene under heating and stirring at 40° C., then 30.12 mL of water glass (pure substance), 0.01 mL of phosphoric acid with a concentration of 2 mol/L and 3 mL of deionized water were added for hydrolysis at 50° C. for 8 hours, wherein a pH of the solution after adding the acid was 5.5.

(3) Preparation of an aerogel film: after the hydrolysis, the mixture was stood for 48 hours, then 0.5 ml of strong aqueous ammonia with a concentration of 10 mol/L and 46.12 mL of ethanol were added for gelling to make a gel viscosity reach 10 cP, the obtained gel was coated on one side of the template having the PAMS by a mechanical coating machine to form an aerogel film with a thickness of 150 µm and the aerogel film was rapidly soaked in a mixed solution of ethanol and tetraethyl orthosilicate (4:1 in v/v) for 24 hours, wherein the mixed solution was replaced three times during the period, and then the aerogel film was taken out to obtain a template loaded with the aerogel film.

(4) Post-treatment of the aerogel film: the template loaded with the aerogel film was subjected in n-heptane at a constant temperature of 40° C. to replace the ethanol in silica sol, and subjected to surface modification by soaking the template loaded with the aerogel film in a mixed solution of TMCS and n-heptane in a volume ratio of 1:9 for 24 hours, dried at 120° C. under normal pressure for 48 hours, and an aerogel film was obtained by being stripped from the glass substrate, and then the aerogel film was calcined at a high temperature of 350° C. for 4 hours to obtain the self-supporting highly moisture-permeable heat-insulating aerogel film.

The obtained self-supporting highly moisture-permeable heat-insulating aerogel film has a thickness of 200 µm, is a flat film which is rolled to form a hollow fiber film. The hollow fiber film has a heat conductivity coefficient of 0.0289 W/(mK), a porosity of 85%, a strength of 1.8 MPa, and an exchange efficiency of vapor of 100%, which is improved by 150% than that of a traditional solid composite film (40%).

Embodiment 5

(1) Preparation of a template: a glass substrate was soaked in ethanol, acetone and deionized water in sequence, and ultrasonically washed for 40 minutes respectively to remove oil stains on a surface, a solution of a terpolymer of acrylamide/2-acrylamido-2-methylpropane sulfonic acid (PAMS) with a concentration of 18 wt. % was filtered through microporous filter paper with a pore size of 30 μm to 50 μm, and then coated on the glass substrate with a coating thickness of 200 μm to obtain a template for later use.

(2) Hydrolysis of nano-cellulose: 10 h g of nano-cellulose whiskers were evenly dispersed in 90 mL of toluene under heating and stirring at 40° C., then 27.82 mL of water glass, 0.05 mL of phosphoric acid with a concentration of 0.5 mol/L and 2 mL of deionized water were added for hydrolysis at 50° C. for 10 hours, wherein a pH of the solution after adding the acid was 6.

(3) Preparation of an aerogel film: after the hydrolysis, the mixture was stood for 48 hours, then 0.3 ml of strong aqueous ammonia with a concentration of 10 mol/L and 56.84 mL of ethanol were added for gelling to make a gel viscosity reach 8 cP, the obtained gel was coated on one side of the template having the PAMS by a mechanical coating machine to form an aerogel film with a thickness of 300 μm and the aerogel film was rapidly soaked in tetraethyl orthosilicate for 48 hours, wherein the tetraethyl orthosilicate was replaced three times during the period, and then the aerogel film was taken out to obtain a template loaded with the aerogel film.

(4) Post-treatment of the aerogel film: the template loaded with the aerogel film was subjected in n-butane at a constant temperature of 40° C. to replace the ethanol in silica sol, and subjected to surface modification by soaking the template loaded with the aerogel film in a mixed solution of TMCS and n-butane in a volume ratio of 1:9 for 24 hours, dried at 80° C. under normal pressure for 48 hours, and an aerogel film was obtained by being stripped from the glass substrate, and then the aerogel film was calcined at a high temperature of 350° C. for 4 hours to obtain the self-supporting highly moisture-permeable heat-insulating aerogel film.

The obtained self-supporting highly moisture-permeable heat-insulating aerogel film has a thickness of 150 μm, is a flat film, and has a heat conductivity coefficient of 0.027 W/(mK), a porosity of 90%, a strength of 1.9 MPa, and an exchange efficiency of vapor of 90%, which is improved by 125% than that of a traditional solid composite film (40%).

Embodiment 6

(1) Preparation of a template: a glass substrate was soaked in ethanol, acetone and deionized water in sequence, and ultrasonically washed for 25 minutes respectively to remove oil stains on a surface, a solution of a terpolymer of acrylamide/2-acrylamido-2-methylpropane sulfonic acid (PAMS) with a concentration of 12 wt. % was filtered through microporous filter paper with a pore size of 30 μm to 50 μm, and then coated on the glass substrate with a coating thickness of 250 μm to obtain a template for later use.

(2) Hydrolysis of nano-cellulose: 8 g of nano-cellulose whiskers were evenly dispersed in 92 mL of dimethylacetamide under heating and stirring at 40° C., then 22.4 mL of trimethylethoxysilane, 2 mL of hydrochloric acid with a concentration of 0.05 mol/L and 3.5 mL of deionized water were added for hydrolysis at 50° C. for 8 hours, wherein a pH of the solution after adding the acid was 5.

(3) Preparation of an aerogel film: after the hydrolysis, the mixture was stood for 24 hours, then 0.6 ml of strong aqueous ammonia with a concentration of 10 mol/L was added for gelling to make a gel viscosity reach 9 cP, the obtained gel was coated on one side of the template having the PAMS by a mechanical coating machine to form an aerogel film with a thickness of 200 μm and the aerogel film was rapidly soaked in ethanol for 48 hours, wherein the ethanol was replaced three times during the period, and then the aerogel film was taken out to obtain a template loaded with the aerogel film.

(4) Post-treatment of the aerogel film: the template loaded with the aerogel film was subjected in n-butane at a constant temperature of 50° C. to replace the ethanol in silica sol, and subjected to surface modification by soaking the template loaded with the aerogel film in a mixed solution of TMCS and n-butane in a volume ratio of 1:9 for 32 hours, dried at 80° C. under normal pressure for 48 hours, and an aerogel film was obtained by being stripped from the glass substrate, and then the aerogel film was calcined at a high temperature of 350° C. for 4 hours to obtain the self-supporting highly moisture-permeable heat-insulating aerogel film.

The obtained self-supporting highly moisture-permeable heat-insulating aerogel film has a thickness of 180 μm, is a flat film which is rolled to form a hollow fiber film. The hollow fiber film has a heat conductivity coefficient of 0.029 W/(mK), a porosity of 87%, a strength of 1.4 MPa, and an exchange efficiency of vapor of 70%, which is improved by 75% than that of a traditional solid composite film (40%).

Embodiment 7

(1) Preparation of a template: a glass substrate was soaked in ethanol, acetone and deionized water in sequence, and ultrasonically washed for 30 minutes respectively to remove oil stains on a surface, a solution of a terpolymer of acrylamide/2-acrylamido-2-methylpropane sulfonic acid (PAMS) with a concentration of 16 wt. % was filtered through microporous filter paper with a pore size of 30 μm to 50 μm, and then coated on the glass substrate with a coating thickness of 210 μm to obtain a template for later use.

(2) Hydrolysis of nano-cellulose: 15 g of nano-cellulose whiskers were evenly dispersed in 85 mL of dimethylacetamide under heating and stirring at 60° C., then 17.2 mL of methyltrimethoxysilane, 1.5 mL of hydrochloric acid with a concentration of 0.1 mol/L and 3.5 mL of deionized water were added for hydrolysis at 50° C. for 7 hours, wherein a pH of the solution after adding the acid was 6.

(3) Preparation of an aerogel film: after the hydrolysis, the mixture was stood for 24 hours, then 0.3 ml of strong aqueous ammonia with a concentration of 10 mol/L was added for gelling to make a gel viscosity reach 10 cP, the obtained gel was coated on one side of the template having the PAMS by a mechanical coating machine to form an aerogel film with a thickness of 150 μm and the aerogel film was rapidly soaked in ethanol for 48 hours, wherein the ethanol was replaced three times during the period, and then the aerogel film was taken out to obtain a template loaded with the aerogel film.

(4) Post-treatment of the aerogel film: the template loaded with the aerogel film was subjected in n-butane at a constant temperature of 60° C. to replace the ethanol in silica sol, and subjected to surface modification by soaking the template loaded with the aerogel film in a mixed solution of TMCS and n-hexane in a volume ratio of 1:12 for 48 hours, dried at 80° C. under normal pressure for 48 hours, and an aerogel film was obtained by being stripped from the glass substrate, and then the aerogel film was calcined at a high temperature of 350° C. for 4 hours to obtain the self-supporting highly moisture-permeable heat-insulating aerogel film.

The obtained self-supporting highly moisture-permeable heat-insulating aerogel film has a thickness of 300 μm, is a flat film, and has a heat conductivity coefficient of 0.0289 W/(mK), a porosity of 92%, a strength of 2.0 MPa, and an exchange efficiency of vapor of 85%, which is improved by 112.5% than that of a traditional solid composite film (40%).

Embodiment 8

(1) Preparation of a template: a glass substrate was soaked in ethanol, acetone and deionized water in sequence, and ultrasonically washed for 35 minutes respectively to remove oil stains on a surface, a solution of a terpolymer of acrylamide/2-acrylamido-2-methylpropane sulfonic acid (PAMS) with a concentration of 20 wt. % was filtered through microporous filter paper with a pore size of 30 μm to 50 μm, and then coated on the glass substrate with a coating thickness of 150 μm to obtain a template for later use.

(2) Hydrolysis of nano-cellulose: 5 g of nano-cellulose whiskers were evenly dispersed in 95 mL of dimethylacetamide under heating and stirring at 40° C., then 22.4 mL of silsesquioxane, 2 mL of oxalic acid with a concentration of 0.5 mol/L and 3.5 mL of deionized water were added for hydrolysis at 80° C. for 12 hours, wherein a pH of the solution after adding the acid was 5.

(3) Preparation of an aerogel film: after the hydrolysis, the mixture was stood for 24 hours, then 1 ml of strong aqueous ammonia with a concentration of 10 mol/L was added for gelling to make a gel viscosity reach 7 cP, the obtained gel was coated on one side of the template having the PAMS to form an aerogel film with a thickness of 200 μm and the aerogel film was rapidly soaked in a mixed solution of ethanol and tetraethyl orthosilicate (ethanol:tetraethyl orthosilicate=1:4 in v/v) for 48 hours, wherein the mixed solution was replaced three times during the period, and then the aerogel film was taken out to obtain a template loaded with the aerogel film.

(4) Post-treatment of the aerogel film: the template loaded with the aerogel film was subjected in n-butane at a constant temperature of 40° C. to replace the ethanol in silica sol, and subjected to surface modification by soaking the template loaded with the aerogel film in a mixed solution of TMCS and n-hexane in a volume ratio of 1:15 for 32 hours, dried at 80° C. under normal pressure for 48 hours, and an aerogel film was obtained by being stripped from the glass substrate, and then the aerogel film was calcined at a high temperature of 350° C. for 4 hours to obtain the self-supporting highly moisture-permeable heat-insulating aerogel film.

The obtained self-supporting highly moisture-permeable heat-insulating aerogel film has a thickness of 250 μm, is a flat film, and has a heat conductivity coefficient of 0.03 W/(mK), a porosity of 83%, a strength of 1.8 MPa, and an exchange efficiency of vapor of 95%, which is improved by 137.5% than that of a traditional solid composite film (40%).

Embodiment 9

(1) Preparation of a template: a glass substrate was soaked in ethanol, acetone and deionized water in sequence, and ultrasonically washed for 20 minutes respectively to remove oil stains on a surface, a solution of a terpolymer of acrylamide/2-acrylamido-2-methylpropane sulfonic acid (PAMS) with a concentration of 10 wt. % was filtered through microporous filter paper with a pore size of 30 μm to 50 μm, and then coated on the glass substrate with a coating thickness of 250 μm to obtain a template for later use.

(2) Hydrolysis of nano-cellulose: 12 g of nano-cellulose whiskers were evenly dispersed in 88 mL of dimethylacetamide under heating and stirring at 40° C., then 27.2 mL of silsesquioxane, 1 mL of oxalic acid with a concentration of 0.8 mol/L and 2 mL of deionized water were added for hydrolysis at 80° C. for 6 hours, wherein a pH of the solution after adding the acid was 5.

(3) Preparation of an aerogel film: after the hydrolysis, the mixture was stood for 24 hours, then 1.5 ml of strong aqueous ammonia with a concentration of 10 mol/L was added for gelling to make a gel viscosity reach 8 cP, the obtained gel was coated on one side of the template having the PAMS by a mechanical coating machine to form an aerogel film with a thickness of 300 μm and the aerogel film was rapidly soaked in a mixed solution of ethanol and tetraethyl orthosilicate (4:1 in v/v) for 72 hours, wherein the mixed solution was replaced three times during the period, and then the aerogel film was taken out to obtain a template loaded with the aerogel film.

(4) Post-treatment of the aerogel film: the template loaded with the aerogel film was subjected in n-butane at a constant temperature of 40° C. to replace the ethanol in silica sol, and subjected to surface modification by soaking the template loaded with the aerogel film in a mixed solution of TMCS and n-hexane in a volume ratio of 1:10 for 48 hours, dried at 80° C. under normal pressure for 72 hours, and an aerogel film was obtained by being stripped from the glass substrate, and then the aerogel film was calcined at a high temperature of 350° C. for 4 hours to obtain the self-supporting highly moisture-permeable heat-insulating aerogel film.

The obtained self-supporting highly moisture-permeable heat-insulating aerogel film has a thickness of 150 μm, is a flat film, and has a heat conductivity coefficient of 0.0295 W/(mK), a porosity of 87%, a strength of 1.5 MPa, and an exchange efficiency of vapor of 110%, which is improved by 175% than that of a traditional solid composite film (40%).

The self-supporting highly moisture-permeable heat-insulating aerogel film of the invention can be used to realize air dehumidification and seawater desalination. The self-supporting highly moisture-permeable heat-insulating aerogel film has a three-dimensional porous network structure, has an extremely low heat conductivity coefficient, and integrates the advantages of high strength, high moisture permeability, high selective permeability and heat insulation. Tests show that under the same experimental conditions, the self-supporting highly moisture-permeable heat-insulating aerogel film improves an exchange rate of vapor by 50% to 200% and reduces the heat conductivity coefficient by 50% to 90% than that of a traditional solid composite film. Meanwhile, the self-supporting highly moisture-permeable heat-insulating aerogel film of the invention has the advantage of high porosity. The preparation method of the self-supporting highly moisture-permeable heat-insulating aerogel film of the invention is simple and easy to operate, less in equipment investment, high in porosity and good in film forming property.

What is claimed is:

1. A preparation method of a self-supporting highly moisture-permeable heat-insulating aerogel film, comprising the following steps:
   (1) washing a glass substrate to remove oil stains on a surface; filtering a solution of a high-molecular polymer through a microporous filter paper and then coating a filtered solution on the glass substrate to obtain a template for later use;
   (2) uniformly dispersing nano-cellulose whiskers in an organic solvent under heating and stirring, and then adding a silicon source, an acid and deionized water for hydrolysis;
   (3) after the hydrolysis, standing a first mixture, adding a gel solution for gelling, coating an obtained gel on one side of the template having the high-molecular polymer to form an aerogel film and rapidly soaking the aerogel film in a solvent, and then taking out the aerogel film to obtain a template loaded with the aerogel film; and
   (4) subjecting the template loaded with the aerogel film to solvent exchange and surface modification, drying, obtaining the aerogel film by stripping the aerogel film from the glass substrate, and then calcining the aerogel film at high temperature to obtain the self-supporting highly moisture-permeable heat-insulating aerogel film.

2. The preparation method of the self-supporting highly moisture-permeable heat-insulating aerogel film according to claim 1, wherein in the step (1), the washing is to soak the glass substrate in ethanol, acetone and deionized water in sequence for respective ultrasound treatment for 20 minutes to 40 minutes; the high-molecular polymer comprises a terpolymer of acrylamide/2-acrylamido-2-methylpropane sulfonic acid; the solution of the high-molecular polymer has a mass concentration of 10 wt. % to 20 wt. %; and the microporous filter paper has a pore size of 30 µm to 50 µm.

3. A self-supporting highly moisture-permeable heat-insulating aerogel film prepared by the preparation method according to claim 2, wherein the self-supporting highly moisture-permeable heat-insulating aerogel film is a self-supporting single-layer film with a $SiO_2$ porous skeleton structure, which has a heat conductivity coefficient of 0.02 W/(mK) to 0.03 W/(mK), has a thickness of 150 µm to 300 µm, and comprises two film types of a flat film and a hollow fiber film; the $SiO_2$ porous skeleton structure is a three-dimensional network structure; and the hollow fiber film is formed by rolling the flat film.

4. The preparation method of the self-supporting highly moisture-permeable heat-insulating aerogel film according to claim 1, wherein in the step (2), the nano-cellulose whiskers are prepared through the following method:
   dissolving cellulose powder in concentrated sulfuric acid under heating and stirring, cooling a second mixture to room temperature, centrifugally washing the second mixture with distilled water to obtain an emulsion suspension without layering; and after dialyzing and separating the obtained emulsion suspension, washing obtained crystals with water and then lyophilizing the crystals to obtain the nano-cellulose whiskers.

5. A self-supporting highly moisture-permeable heat-insulating aerogel film prepared by the preparation method according to claim 4, wherein the self-supporting highly moisture-permeable heat-insulating aerogel film is a self-supporting single-layer film with a $SiO_2$ porous skeleton structure, which has a heat conductivity coefficient of 0.02 W/(mK) to 0.03 W/(mK), has a thickness of 150 µm to 300 µm, and comprises two film types of a flat film and a hollow fiber film; the $SiO_2$ porous skeleton structure is a three-dimensional network structure; and the hollow fiber film is formed by rolling the flat film.

6. The preparation method of the self-supporting highly moisture-permeable heat-insulating aerogel film according to claim 4, wherein the heating and stirring is to stir at 60° C. to 80° C.; the concentrated sulfuric acid has a concentration of 50 wt. % to 70 wt. %; the cooling to room temperature is to directly add distilled water for cooling; the dialyzing is to put the emulsion suspension obtained by centrifugation into a cellulose dialysis bag and then put the cellulose dialysis bag into deionized water for dialysis until a pH value of a dialysate reaches 7.0; and the lyophilizing is to lyophilize at −50° C. to −30° C.

7. A self-supporting highly moisture-permeable heat-insulating aerogel film prepared by the preparation method according to claim 6, wherein the self-supporting highly moisture-permeable heat-insulating aerogel film is a self-supporting single-layer film with a $SiO_2$ porous skeleton structure, which has a heat conductivity coefficient of 0.02 W/(mK) to 0.03 W/(mK), has a thickness of 150 µm to 300 µm, and comprises two film types of a flat film and a hollow fiber film; the $SiO_2$ porous skeleton structure is a three-dimensional network structure; and the hollow fiber film is formed by rolling the flat film.

8. The preparation method of the self-supporting highly moisture-permeable heat-insulating aerogel film according to claim 1, wherein in the step (2), the silicon source comprises one of tetramethyl orthosilicate, tetraethyl orthosilicate, methyltrimethoxysilane, water glass, trimethylethoxysilane and silsesquioxane; and different organic solvents are added according to different silicon sources: when the silicon source is tetramethyl orthosilicate, the organic solvent is dimethyl sulfoxide; when the silicon source is tetraethyl orthosilicate, the organic solvent is ethanol; when the silicon source is methyltrimethoxysilane, the organic solvent is tetrahydrofuran; when the silicon source is sodium silicate, the organic solvent is toluene; and when the silicon source is trimethylethoxysilane or silsesquioxane, the organic solvent is dimethylacetamide.

9. A self-supporting highly moisture-permeable heat-insulating aerogel film prepared by the preparation method according to claim 8, wherein the self-supporting highly moisture-permeable heat-insulating aerogel film is a self-supporting single-layer film with a $SiO_2$ porous skeleton structure, which has a heat conductivity coefficient of 0.02 W/(mK) to 0.03 W/(mK), has a thickness of 150 µm to 300 µm, and comprises two film types of a flat film and a hollow fiber film; the $SiO_2$ porous skeleton structure is a three-dimensional network structure; and the hollow fiber film is formed by rolling the flat film.

10. The preparation method of the self-supporting highly moisture-permeable heat-insulating aerogel film according to claim 1, wherein in the step (2), a solid-liquid ratio of the nano-cellulose whiskers to the organic solvent is 5-10: 80-100 g/ml; a mass ratio of the organic solvent to the silicon source is 0.8-1.5:0.3-0.6; a volume ratio of the organic solvent to the deionized water is 30-50: 2-4; and an addition amount of the acid is added according to a molar ratio of hydrogen atoms in the acid to silicon atoms in the silicon source of $10^{-5}$-$10^{-3}$: 1-3, wherein a pH value of the solution after the acid is added is 5-6.

11. A self-supporting highly moisture-permeable heat-insulating aerogel film prepared by the preparation method according to claim 10, wherein the self-supporting highly moisture-permeable heat-insulating aerogel film is a self-supporting single-layer film with a $SiO_2$ porous skeleton structure, which has a heat conductivity coefficient of 0.02 W/(mK) to 0.03 W/(mK), has a thickness of 150 μm to 300 μm, and comprises two film types of a flat film and a hollow fiber film; the $SiO_2$ porous skeleton structure is a three-dimensional network structure; and the hollow fiber film is formed by rolling the flat film.

12. The preparation method of the self-supporting highly moisture-permeable heat-insulating aerogel film according to claim 1, wherein in the step (2), the heating and stirring is to heat and stir at 40° C. to 80° C.; the hydrolysis is carried out for 6 hours to 12 hours at a temperature of 40° C. to 80° C.

13. A self-supporting highly moisture-permeable heat-insulating aerogel film prepared by the preparation method according to claim 12, wherein the self-supporting highly moisture-permeable heat-insulating aerogel film is a self-supporting single-layer film with a $SiO_2$ porous skeleton structure, which has a heat conductivity coefficient of 0.02 W/(mK) to 0.03 W/(mK), has a thickness of 150 μm to 300 μm, and comprises two film types of a flat film and a hollow fiber film; the $SiO_2$ porous skeleton structure is a three-dimensional network structure; and the hollow fiber film is formed by rolling the flat film.

14. The preparation method of the self-supporting highly moisture-permeable heat-insulating aerogel film according to claim 1, wherein in the step (3), the standing lasts for 24 hours to 48 hours; the gel solution comprises one or more than one of aqueous ammonia, ethanol, dimethyl sulfoxide and hexamethyldisilazane; the gelling is to add the gel solution to enable a viscosity of the gel to reach 7 cP to 20 cP; the solvent comprises one or more than one of ethanol, tetraethyl orthosilicate and dimethyl sulfoxide; the soaking lasts for 24 hours to 72 hours, and the solvent is changed every 8 hours to 16 hours.

15. A self-supporting highly moisture-permeable heat-insulating aerogel film prepared by the preparation method according to claim 14, wherein the self-supporting highly moisture-permeable heat-insulating aerogel film is a self-supporting single-layer film with a $SiO_2$ porous skeleton structure, which has a heat conductivity coefficient of 0.02 W/(mK) to 0.03 W/(mK), has a thickness of 150 μm to 300 μm, and comprises two film types of a flat film and a hollow fiber film; the $SiO_2$ porous skeleton structure is a three-dimensional network structure; and the hollow fiber film is formed by rolling the flat film.

16. The preparation method of the self-supporting highly moisture-permeable heat-insulating aerogel film according to claim 1, wherein in the step (4), the solvent exchange and surface modification are to replace the solvent in a silica sol used for soaking in the step (3) with one of dimethyl sulfoxide, n-hexane, n-heptane and n-butane at a constant temperature of 40° C. to 60° C. and then to soak the template with a trimethylchlorosilane solution for 24 hours to 28 hours to perform the surface modification; one of the n-hexane, the n-heptane and the n-butane is employed as a solvent of the trimethylchlorosilane solution, wherein a volume ratio of the trimethylchlorosilane to the solvent is 1:9-15; the drying is to dry at 80° C. to 120° C. under normal pressure for 24 hours to 48 hours; the calcining at high temperature is carried out for 4 hours to 8 hours at 350° C. to 450° C.

17. A self-supporting highly moisture-permeable heat-insulating aerogel film prepared by the preparation method according to claim 16, wherein the self-supporting highly moisture-permeable heat-insulating aerogel film is a self-supporting single-layer film with a $SiO_2$ porous skeleton structure, which has a heat conductivity coefficient of 0.02 W/(mK) to 0.03 W/(mK), has a thickness of 150 μm to 300 μm, and comprises two film types of a flat film and a hollow fiber film; the $SiO_2$ porous skeleton structure is a three-dimensional network structure; and the hollow fiber film is formed by rolling the flat film.

18. A self-supporting highly moisture-permeable heat-insulating aerogel film prepared by the preparation method according to claim 1, wherein the self-supporting highly moisture-permeable heat-insulating aerogel film is a self-supporting single-layer film with a $SiO_2$ porous skeleton structure, which has a heat conductivity coefficient of 0.02 W/(mK) to 0.03 W/(mK), has a thickness of 150 μm to 300 μm, and comprises two film types of a flat film and a hollow fiber film; the $SiO_2$ porous skeleton structure is a three-dimensional network structure; and the hollow fiber film is formed by rolling the flat film.

\* \* \* \* \*